No. 667,350. Patented Feb. 5, 1901.
J. ULRICH & C. WITTKE.
MECHANISM FOR CONVERTING RECIPROCATING INTO ROTARY MOTION.
(Application filed Mar. 26, 1900.)
(No Model.)

WITNESSES:
John E. Burch
J. T. Burch

INVENTORS:
John Ulrich, and
Carl Wittke,
by Finckel & Finckel,
ATTORNEYS

UNITED STATES PATENT OFFICE.

JOHN ULRICH AND CARL WITTKE, OF COLUMBUS, OHIO.

MECHANISM FOR CONVERTING RECIPROCATING INTO ROTARY MOTION.

SPECIFICATION forming part of Letters Patent No. 667,350, dated February 5, 1901.

Application filed March 26, 1900. Serial No. 10,258. (No model.)

*To all whom it may concern:*

Be it known that we, JOHN ULRICH and CARL WITTKE, citizens of the United States, residing at Columbus, in the county of Franklin and State of Ohio, have invented certain new and useful Improvements in Mechanism for Converting Reciprocating Motion into Rotary Motion; and we do hereby declare the following to be a full, clear, and exact description of the invention, such as will enable others skilled in the art to which it appertains to make and use the same.

The present invention is an improvement upon the machine shown in Letters Patent of the United States granted to us July 20, 1897, No. 586,829. When our machine as shown in our said patent was used for operating a drill or tap, we found that the vibration of the machine in the hands was annoying to the operator. This excessive vibration was due to the fact that the engine always did the heavier work with the same stroke of the piston. Our present invention aims to provide a machine in which there is practically no vibration and to make other improvements in the interests of simplicity and economy of construction.

The features of novelty are pointed out by the claims at the end of the following description.

Figure 1:
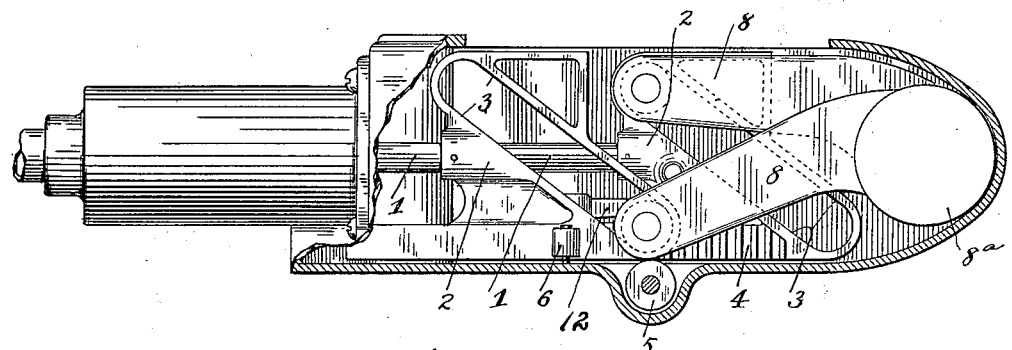
Figure 2:
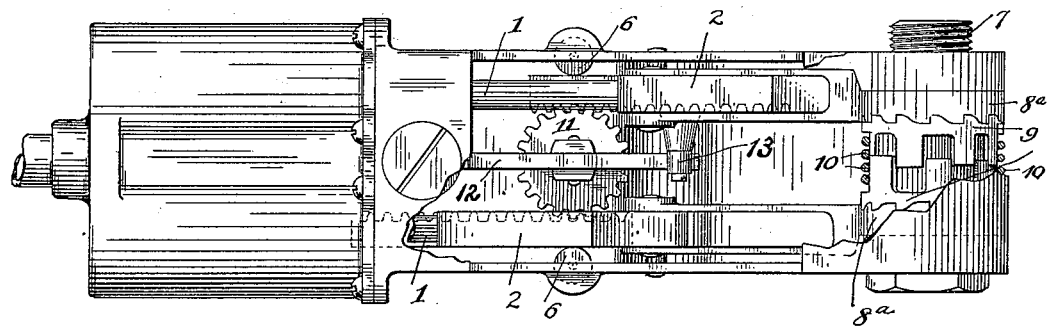
Figure 3:
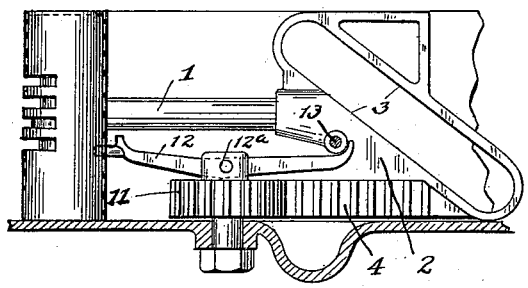

In the accompanying drawings, Figure 1 is a view in side elevation, the casing being broken out. Fig. 2 is a plan view, the cap-plate being removed and parts of the casing being broken out. Fig. 3 is a detail view of one cross-head and the lever for operating the engine-valve.

In the drawings two cylinders are shown, each containing a piston with rods 1 1. The engine is devised to reciprocate these rods in opposite directions. The outer ends of the rods are furnished with cross-heads 2 2, each having inclined ways 3 and toothed rack portions 4. To reduce friction, the cross-heads can run on rollers 5 in the bottom of the casing and against rollers 6 in the sides of the casing. The upper sides of the cross-heads can run in guideways in the upper side of the casing or in a removable cover thereon. (Not shown, but well understood.) Journaled in bearings in the casing beyond the cross-heads is a shaft 7, that is shown to have its protruding end threaded to receive, for example, the chuck of a drill or a tap. Journaled in the machine concentrically of the axis of this shaft 7 are also the symmetrically-toothed heads $8^a$ on arms 8, that reach back into the casing and have their ends adapted to engage the ways 3 in the cross-heads 2. When the cross-heads are reciprocated by the engine, the arms and their toothed heads are rocked in opposite directions. Between the toothed heads of the driving-arms 8 are symmetrically-toothed clutches 9, one or both of which are slidably keyed or otherwise appropriately connected to the shaft 7, so that when such clutches are rotated the shaft 7 is rotated with them. The clutches are shown to be formed to interlock with each other; but they are held by a spring 10, so as to engage or to tend to engage with the teeth of the heads $8^a$ of the arms 8. Therefore when these arms are rocked one of the heads $8^a$ will impel the shaft 7 through one clutch in one direction, while the teeth of the opposite arm will slip in the opposite direction over the teeth of the other clutch. The means for communicating the motion of the heads of the arms 8 to the shaft 7, however, does not constitute a part of the present invention, and those means may be varied without departing from the scope of our present claims.

Journaled in the casing in the plane of the racks 4 is a toothed wheel 11, that meshes with both the racks and rotates when the cross-heads are reciprocated. When the shaft 7 contains a tooth that is to do work, it is obvious that more power is required to propel the shaft than to simply rock the head $8^a$ over the teeth of the contiguous clutch. Therefore the primary function of the intermediate toothed wheel 11 is to couple the power of the cross-head that is not driving the shaft with that of the cross-head that is doing this work. This arrangement we find does away with all annoying vibration of the machine.

In the machine shown the valve of the engine is operated by a tappet-lever 12, fulcrumed at $12^a$, said lever being actuated by a pin 13, projecting from one of the cross-heads.

As the details of the interior construction of the engine do not constitute a subject of any claim in this patent, it has been deemed unnecessary to delineate such construction in the drawings.

The power employed to work the engine may be any fluid under pressure.

What we claim, and desire to secure by Letters Patent, is—

1. The combination of separate and oppositely-reciprocating rods of an engine or motor, cross-heads on said rods having inclined ways, racks on said cross-heads, a gear intermediate of said racks and engaging them to communicate the action of one rod or cross-head to the other, and shaft-driving arms engaging the inclined ways of the cross-heads, substantially as described.

2. The combination of separate reciprocating rods of an engine or motor, cross-heads on said rods having inclined ways, shaft-driving arms engaging the said inclined ways, the engine or motor, a valve therefor, a tappet-lever 12, and a pin reciprocated by one of said rods to operate said tappet-lever, substantially as described.

3. The combination with a casing having antifriction-rollers therein, piston-rods having cross-heads thereon bearing upon said rollers, said cross-heads each having inclined ways and inwardly-facing racks, and a gear interposed between and engaging the teeth of both racks at a point between said antifriction-rollers, of shaft-driving arms journaled at one end and engaging the inclined ways at the other.

In testimony whereof we affix our signatures in presence of two witnesses.

JOHN ULRICH.
CARL WITTKE.

Witnesses:
GEORGE W. ALFRED,
GEORGE M. FINCKEL.